Patented Aug. 5, 1930

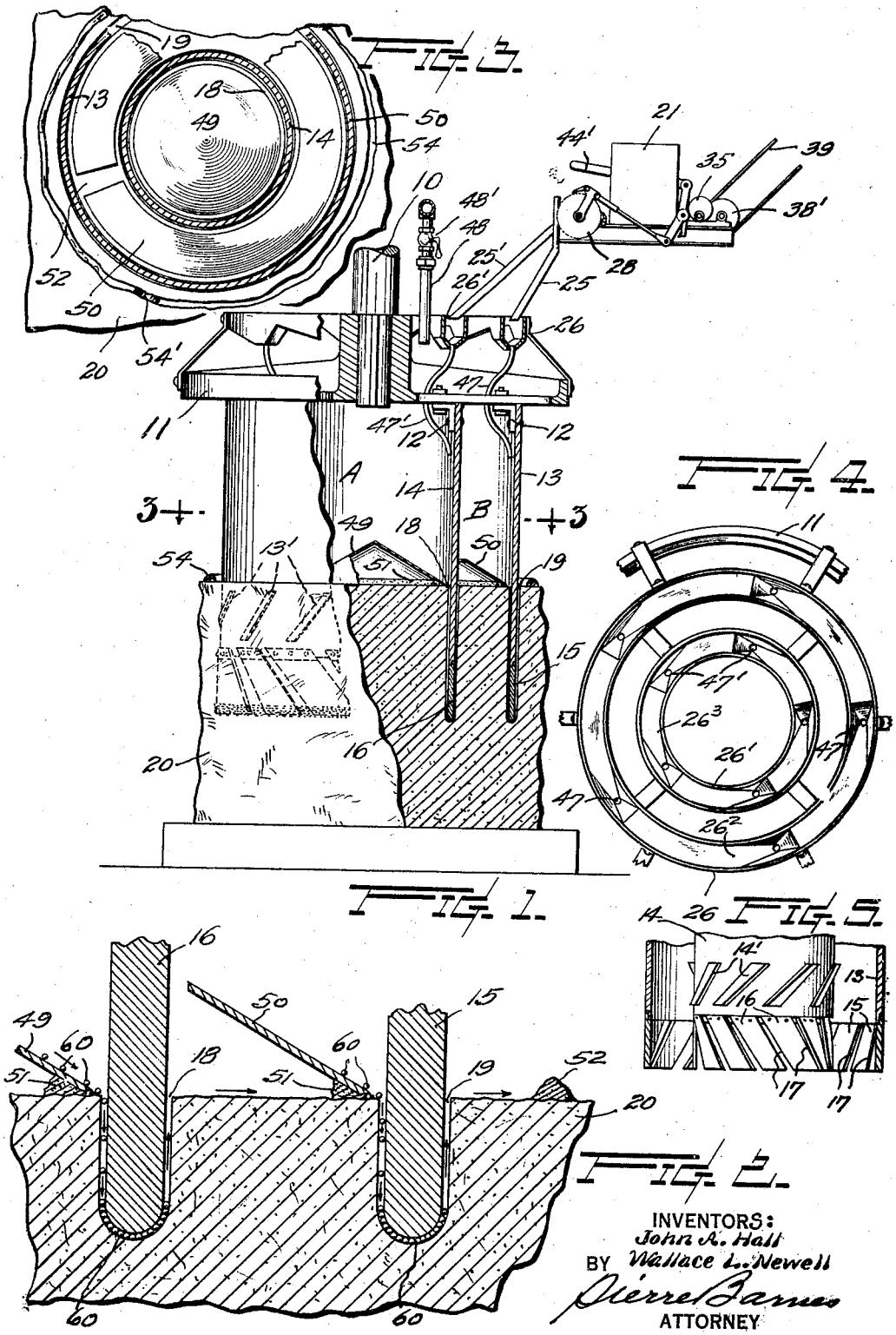

1,772,001

UNITED STATES PATENT OFFICE

JOHN A. HALL AND WALLACE L. NEWELL, OF SEATTLE, WASHINGTON, ASSIGNORS TO PARKER ROTARY STONE SAW COMPANY, OF SAN FRANCISCO, CALIFORNIA, A CORPORATION OF NEVADA

STONE-CUTTING MACHINE

Application filed January 3, 1928. Serial No. 244,166.

This invention relates to machines for cutting granite and other kinds of stone into blocks of cylindrical or annular shape by means of a cylindrical saw or saws through the medium of a suitable abrasive material.

The object of the invention is the improvement of mechanism of this character to render the same more efficient and rapid in operation.

More specific objects and advantages of the invention will appear in the following description.

The invention consists in novel means for connecting the cylindrical saws and the distributor for the abrasive material to the arbor.

The invention further consists in means associated with the saws for directing the abrasive material and flushing water therefor most effectually to the work.

The invention further consists in means for impelling water through the saw kerfs in a direction substantially radially of the axis of the saw's rotation.

The invention further consists in the novel construction and adaptation of parts and in the novel combinations thereof hereinafter described and particularly set forth in the appended claims.

The invention in its form now preferred by us is illustrated in the accompanying drawings, in which,—

Figure 1 is a view in side elevation of stone sawing devices embodying the present invention shown applied, parts being broken away and parts shown in vertical transverse section. Fig. 2 is a detail vertical section showing portions of the teeth of two saws, the work and the means for directing the abrasive to the saws.

Fig. 3 is a horizontal sectional view on line 3—3 of Fig. 1. Fig. 4 is a top plan view of the rotary shot distributor, and the saw-carrier shown partly broken away. Fig. 5 is a view in side elevation of the lower portion of the inner saw and a transverse vertical section of the outer saw.

Referring to said drawings, the numeral 10 designates a vertically arranged shaft or arbor which has secured to its lower end, a wheel 11 to which are rigidly secured, as by means of angle bars 12, two cylindrical shells 13 and 14 arranged concentrically of the arbor axis. Secured to the lower edges of the respective shells are teeth 15 and 16, each of a tetragonal shape, preferably, in side elevation with an inclined front edge, as 17, and in horizontal section an arcuate shape concentric with the arbor axis. Said shells and the respective teeth constitute the saws of the present invention.

Said arbor is rotated and has axial feed motion imparted thereto by suitable known mechanism (not shown) to cause the saws to coact with an abrasive material, preferably chilled steel shot, or shot as hereinafter termed, for cutting of annular grooves, or kerfs, as 18 and 19, in the work or a block 20 of stone.

Said shot is supplied by gravitation upon the work to the cutting circle of the saws or into the respective saw kerfs and includes a hopper 21 (Fig. 1) which, in the two-saw machine shown, is provided with two discharge chutes having in their delivery ends shot dispensing wheels (not shown) for conveying measured quantities of shot from said chutes to conduits 25, 25¹ leading to circular distributing troughs 26, 26¹ which are mounted upon the saw-carrying wheel 11.

The above mentioned shot dispensing wheels operated by any known or suitable mechanism as, for example, a ratchet wheel 28 which is intermittently rotated by means of a pawl through the medium of linkage actuated by a cam 35 which is rotated through the medium of transmission devices, shown in a co-pending application, from a shaft having thereon a pulley 38¹ for a power driven belt 39. 44¹ represents a lever arm whereby said linkage may be manually brought into and out of operative relation with the actuating cam 35.

The floors 26² and 26³ of the distributing troughs 26 and 26¹, as shown in Fig. 1, are inclined downwardly whereby the shot deposited by the conduits 25, 25¹ into the respective troughs gravitate to delivery tubes 47 and 47¹ (Fig. 1) having their discharge ends located in close relation with the inner peripheries of the respective shells 13 and 14. 48 represents a service water pipe provided with a regulating valve 48¹ for delivering water as desired into the space A enclosed by the inner shell 14.

The shot from the delivery tubes 47 and 47¹ which may not fall into the respective kerfs 19 and 18 is directed therein by means of circular deflectors 49 and 50 which are mounted concentrically of the saw axis upon the top of the work 20, see Figs. 1 and 2, and are secured thereto as by means of plaster of Paris or other suitable material which is indicated by 51.

The deflector 49 which is located in the space A enclosed by the inner saw 14 is desirably of a conical shape; and the other deflector 50 which is located in the annular space B between the saws 14 and 13 is of a conoidal segmental shape with a gap 52 (Fig. 3) therein to afford a way for the water in its travel from the kerf 18 to the kerf 19. The shot supplied to the respective kerfs remain therein until worn or pulverized and is thereupon carried away with the stone grindings by the current of water passing through the kerfs. The water from the nozzle of pipe 48 enters the space A, thence into the kerf 18 wherein it flows downwardly and upwardly about the portion of the saw 14 into the space B over the top surface of the work and through passage 52 in deflector 50 to the kerf 19 wherein the water travels downwardly and upwardly to escape over the margin of the work.

The delivery of the water from the kerf 19 may, however, by the construction of a dam 54, be regulated to ensure water being provided to the saws before the kerfs are formed thereby; or, when it is desirable to maintain a head of water in excess to that provided by the depth of the kerfs. 54¹ represents an opening in the dam through which waste water is discharged.

It is, nevertheless, desirable to maintain an uninterrupted passage for the water through the kerfs to prevent its being clogged by silt, or stone grindings, and for which purpose we provide on the outer periphery of each saw, or more particularly its shell, series of ridges such as 13¹ and 14¹ (Figs. 1 and 5) which are arranged somewhat helically so as to serve as spiral pumping elements when revolved with the respective saws.

The cutting of the stone is performed by rotating the arbor 10 to drive the saws as they are gradually fed into the work. As the cutting proceeds, the revoluble movement of the saw teeth cooperate with the shot to abrade annular kerfs 18 and 19 in the stone; the water serving to flush out the stone dust.

The shot, which is indicated by 60 in Fig. 2, acts in a known manner between the lower surface of each saw tooth and the bottom of the respective kerf.

The construction and operation of the invention will be understood from the foregoing description.

What we claim, is,—

1. In a stone-sawing machine, a pair of concentric cylindrical saws, means for supplying abrading material to the cutting teeth of each of said saws, means for supplying water to said saws, and helically arranged ridges provided upon the outer peripheries of said saws for inducing the flow of water from the respective saws.

2. In a stone-sawing machine, a pair of concentric cylindrical saws, means for supplying abrading material to the cutting teeth of each of said saws, means for supplying water to the inner of said saws, and helically arranged ridges provided upon the outer peripheries of said saws for inducing the flow of water from both of the saws.

3. In a stone-sawing machine having two concentrically arranged cylindrical saws, means for supplying shot to each of said saws separately, means to supply water to the inner saw, and shot guiding means provided within the inner saw and the annular space between the saws, the shot guiding means in said annular space being provided with an opening for the passage of water from the inner saw to the outer saw.

Signed at Seattle, Washington, this 21st day of December, 1927.

JOHN A. HALL.
WALLACE L. NEWELL.